Jan. 12, 1926.  
J. SCHINDLER  
GRATING OR SLICING MACHINE  
Filed March 20, 1925    3 Sheets-Sheet 2
1,569,399
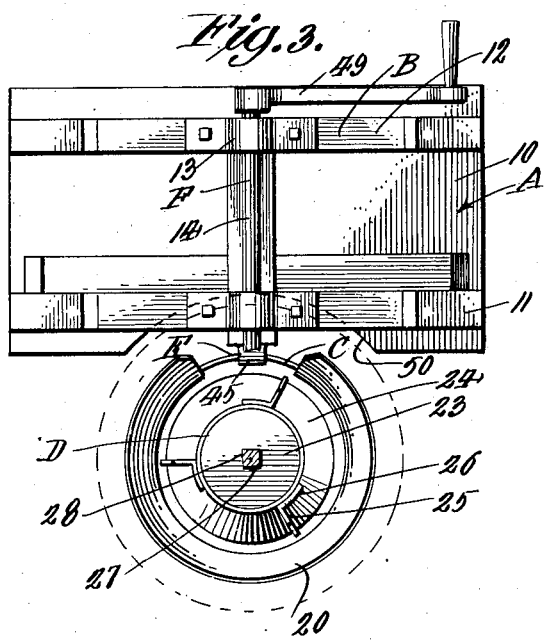
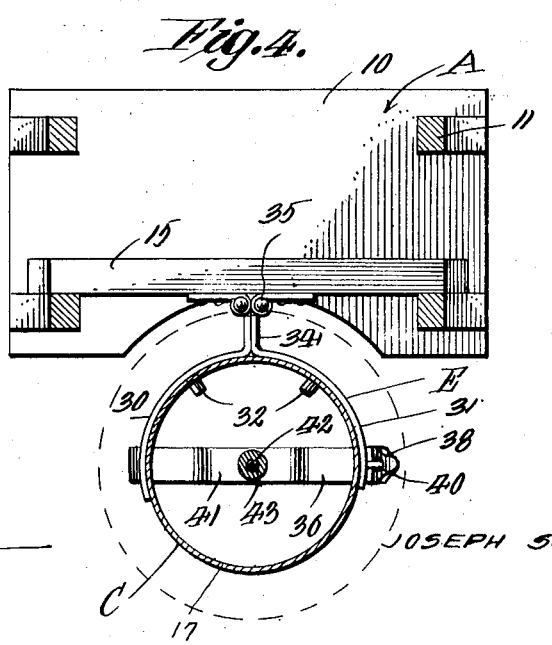
WITNESSES  
Inventor  
JOSEPH SCHINDLER  
By  
Attorney Jan. 12, 1926.                                          1,569,399
J. SCHINDLER
GRATING OR SLICING MACHINE
Filed March 20, 1925          3 Sheets-Sheet 3
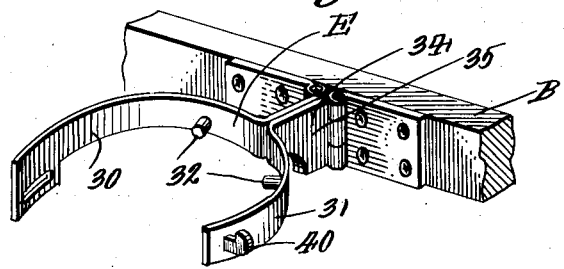
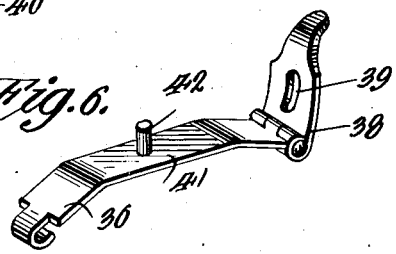
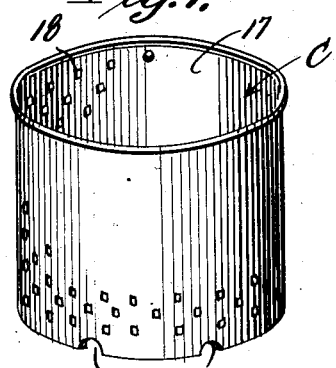
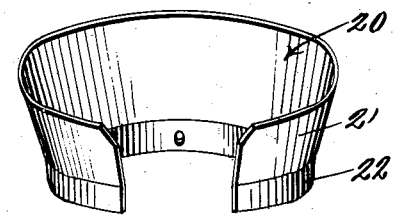
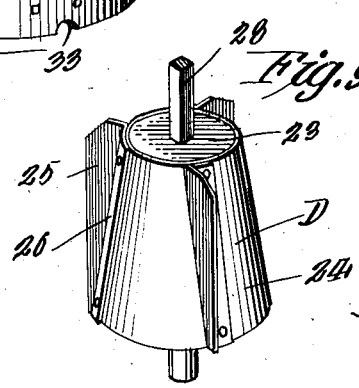
Inventor
JOSEPH SCHINDLER Patented Jan. 12, 1926.

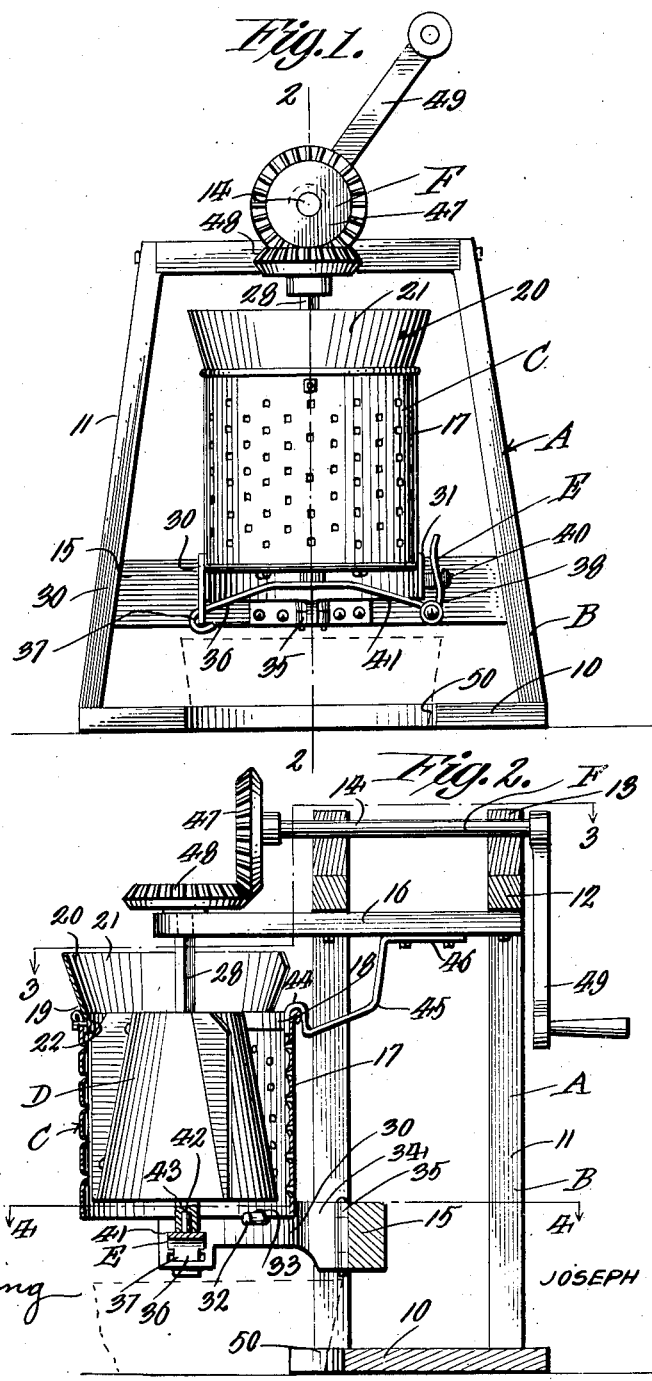

1,569,399

UNITED STATES PATENT OFFICE.

JOSEPH SCHINDLER, OF BURNEY, CALIFORNIA.

GRATING OR SLICING MACHINE.

Application filed March 20, 1925. Serial No. 17,038.

*To all whom it may concern:*

Be it known that I, JOSEPH SCHINDLER, a citizen of the United States, residing at Burney, in the county of Shasta and State of California, have invented certain new and useful Improvements in Grating or Slicing Machines, of which the following is a specification.

This invention appertains to a novel device for slicing or grating vegetables and the primary object of the invention is to provide a novel device for permitting a relatively large quantity of potatoes to be effectively grated or sliced in a minimum amount of time and with the expenditure of a minimum amount of energy.

Another object of the invention is the provision of a novel receptacle for receiving the vegetables to be grated having cutting members projecting radially in the same and a conical drum provided with scraping blades rotatably mounted within the receptacle.

A further object of the invention is the provision of a novel frame and novel means for rotating the drum.

A further object of the invention is the provision of novel means for detachably holding the receptacle in position, said means permitting the quick releasing of the receptacle when necessary.

A further object of the invention is the provision of novel means for supporting the lower end of the shaft for the drum by said receptacle holding means.

A still further object of the invention is to provide an improved vegetable grater and slicer of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed and illustrated in the accompanying drawings, in which drawings:

Figure 1 is an elevation of the improved device,

Figure 2 is a vertical section through the same taken on the line 2—2 of Figure 1, Figure 3 is a horizontal section through the improved device on the line 3—3 of Figure 2 looking in the direction of the arrows, Figure 1 is a horizontal section through the improved vegetable grater or slicer taken on the line 4—4 of Figure 2 looking in the direction of the arrows and illustrating the novel means for supporting the receptacle, Figure 5 is a fragmentary perspective view illustrating a part of the receptacle holding means, Figure 6 is a detail perspective view of the locking band for the receptacle holding means, Figure 7 is a detail perspective view of the receptacle for receiving the vegetables to be grated, Figure 8 is a detail perspective view of the guide flange or hopper for the receptacle, and Figure 9 is a perspective view of the operating drum.

Referring to the drawings in detail, wherein similar reference characters designate like or corresponding parts throughout the several views, the letter A generally indicates the improved vegetable grater or slicer which comprises the supporting frame B; the receptacle C for receiving the vegetables, the operating drum D; the means E for holding the receptacle in place; and the operating means F for the drum.

The frame B can be constructed from any desired materials and as shown embodies a base plate 10 to which are secured the uprights 11. As shown the uprights are arranged in pairs, and the pairs of uprights have their upper ends connected by cross pieces 12 which support bearings 13 for the drive shaft 14, which forms a part of the drum operating means F as will be hereinafter more fully described. The front pair of uprights 11 support a cross beam 15, which serves as means for bracing the frame and also as means for supporting the receptacle holding means E as will be hereinafter more fully described. Disposed in the central portion of the frame B is the forwardly projecting bar 16, which is secured in any desired way to the cross top pieces 12. The forward end of this bar 16 carries the bearing, for the purpose, which will be hereinafter more fully described.

The improved receptacle C for receiving the vegetables to be grated is preferably formed from sheet metal and is arranged in front of the frame, as can be clearly seen by referring to Figures 2 and 3. This receptacle includes a cylindrical shell 17 having struck therefrom a plurality of grating points or projections 18. The upper end of the shell 17 is preferably rolled as at 19 to provide a reinforcing bead for the same. As clearly shown the upper and lower ends of the shell are left open for a purpose, which will be hereinafter more fully described. An open hopper 20 is preferably provided for the upper end of the receptacle so as to facilitate the guiding of the vegetables into the receptacle. As shown this hopper is provided with a flared outer wall 21 and a depending flange 22, which fits into the upper end of the receptacle and this flange can be connected with the receptacle in any desired way, such as by bolts or the like.

Arranged axially within the receptacle C is the drum D. This drum is of a frusto-conical configuration and terminates short of the lower end of the receptacle. The drum can be constructed in any desired way, such as with a solid center 23 and a metal facing 24. At spaced points, the outer face of the drum has secured thereto radially projecting blades 25, which are adapted to move the vegetables past the cutting points or projections 18. The inner ends of the radially extending blades 25 are provided with attaching flanges 26 which can be riveted or otherwise secured to the drum. A polygonal shaped axial bore 27 is provided for the drum and this bore detachably receives the polygonal driven shaft 28 which forms a part of the drum operating means F as will be hereinafter more fully described.

The means E for holding the receptacle in place forms an important part of the present invention and permits the convenient placing of the receptacle in position and the firm holding of the same in place. This receptacle holding means embodies a pair of arcuate arms 30 and 31, which are adapted to partially embrace the receptacle and these arcuate arms are provided with inwardly extending pins 32, which are adapted to fit within notches 33 formed in the lower edge of the receptacle. The meeting ends of the arms 30 and 31 are provided with inwardly extending supporting legs 34, which are hinged as at 35 to the central portion of the supporting bar 15 as heretofore mentioned.

In order to hold the arms 30 and 31 in intimate contact with the receptacle and to provide means for supporting the drum D and the lower end of the driven shaft 28 a diametrically extending locking bar 36 is provided. One end of this bar 36 is hingedly connected as at 37 to the arm 30, while the other end of the locking bar carries a pivoted latch 38 provided with a slot 39 for receiving a keeper hook 40. It is obvious that when the bar is swung across the lower end of the receptacle and the latch 38 hooked over the keeper 40, that the arms will be prevented from swinging movement on their hinges and that the pins 32 will be held in the notches 33.

The locking bar 36 is provided with a raised flat central portion 31 on which the drum can rest and at the direct center of the bar is provided an upstanding bearing pin 42 which is adapted to fit in the axial opening 43 formed in the lower end of the driven shaft. It can be seen that the pin forms a thrust bearing for the lower end of the said driven shaft.

In order to prevent tilting movement of the receptacle on the arms 30 and 31, a hook 44 is provided for engaging the upper edge of the receptacle at a point intermediate the pins 30. This hook 44 is carried by a strap 45 which is secured as at 46 to the forwardly extending piece 16.

When it is desired to release the receptacle, for any reasons, it is merely necessary to move the latch 38 from out of engagement with the keeper hook 40 and swing the locking bar 36 downward, after which the arms 31 and 30 will be swung on their hinges out of contact with the receptacle. The receptacle can now be slid downward out of engagement with the hook 44. The drum B can now also be readily removed from the driven shaft.

The upper end of the driven shaft is preferably of a cylindrical shape in cross section and is rotatably mounted in the bearing carried by the forward end of the beam 16 as heretobefore described.

The means F for operating the drum D embodies the shafts 14 and 28 and these shafts have their adjacent ends operatively connected together by means of beveled gears 47 and 48 which can be keyed or otherwise secured to said shaft. The terminal of the shaft 14 which is opposite the beveled gear 47 is provided with an operating crank 49. It is obvious that by operating the crank 49, the drum D can be easily rotated within the receptacle C.

It is to be also noted at this point that the receptacle C is spaced from the lower end of the frame 11 so as to permit the convenient placing of a receptacle receiving the grated vegetable under the same. The forward edge of the base plate 10 can be notched as at 50 to permit the easy placing of the pan or receptacle for receiving the crushed vegetables in place.

In use of the improved device, the vegetables to be grated or sliced are placed in the hopper 21 after which the crank 49 is turned. The drum D will move the vegetables past the scraping or cutting points 19 which will effectively grate the vegetables. The grated vegetables will now fall from the bottom of the receptacle into the pan.

Changes in details may be made without departing from the spirit or scope of this invention but—

What I claim as new is:

1. A vegetable grater comprising a frame, a cylindrical shell disposed upon the frame, means for detachably holding the shell in position on the frame, a frusto-conical drum rotatably mounted within the shell, radially extending blades carried by the drum for moving the vegetables past the scraping points of the shell, and means for rotating said drum.

2. A vegetable grater comprising a frame, a cylindrical shell for receiving the vegetables to be grated, a plurality of radially extending cutting and grating points formed on the shell, a rotatable frusto-conical shell disposed axially within the shell, radially extending blades carried by the periphery of the drum for moving the vegetables to be grated pasted said grating and cutting points, a hopper for the upper end of the shell, releasable means for detachably engaging the shell for holding the same in position against movement, and means disposed at one side of the frame for rotating said drum.

3. In a vegetable grater a frame, a cylindrical shell disposed at the front of the frame above the lower end thereof including a plurality of inwardly projecting grating points, means carried by the frame for detachably engaging the shell for holding the frame in position, a frusto-conical drum disposed axially within the shell, a plurality of radially extending blades carried by the drum for moving the vegetables in the shell past said grating points, a driven shaft carried by the frame disposed axially within the shell, means for removably mounting the drum upon the driven shaft for movement therewith, an operating shaft carried by the upper end of the frame, means actuating the operating shaft, and means for operatively connecting the operating and driven shafts together.

4. In a vegetable grater and cutter, a frame, a cylindrical shell provided with a plurality of inwardly projecting grating points and having its lower edge provided with seats, a pair of arcuate arms hingedly connected to the frame and adapted to be moved into and out of engagement with the lower end of the shell, inwardly projecting pins carried by the arms for fitting in the seats carried by the shell, a rigid hook carried by the frame for engaging the upper edge of the shell intermediate the pins, and a locking bar for detachably connecting the arms together.

5. In a vegetable grater and cutter, a frame, a receptacle disposed in front of the frame and above the lower end thereof, an operating shaft disposed axially within the shell, a drum removably fitted upon the shaft for movement therewithin arranged within the receptacle, a pair of arcuate arms hingedly connected to the frame for movement into and out of engagement with the lower edge of the receptacle, pins carried by the arms for engaging the receptacle, and a locking strap for detachably connecting the arms together and pins in intimate contact with the receptacle, and means carried by the locking bar for engaging the operating shaft and said drum.

6. In a vegetable grater and slicer, a frame, a cylindrical shell provided with a plurality of inwardly projecting grating points and seats at the lower edge thereof, an operating shaft extending axially within the shell, a frusto-conical drum removably fitted upon the shaft for movement therewith, means for operating the shaft, a pair of arcuate arms hingedly connected with the frame for movement into and out of engagement with the shell, means carried by the arms for locking engagement with the shell, and a locking bar hingedly connected with one of said arms, means for detachably connecting the locking bar with the other arm and a thrust bearing pin carried by said bar for engaging the operating shaft.

In testimony whereof I affix my signature.

JOSEPH SCHINDLER.